Figure 1:
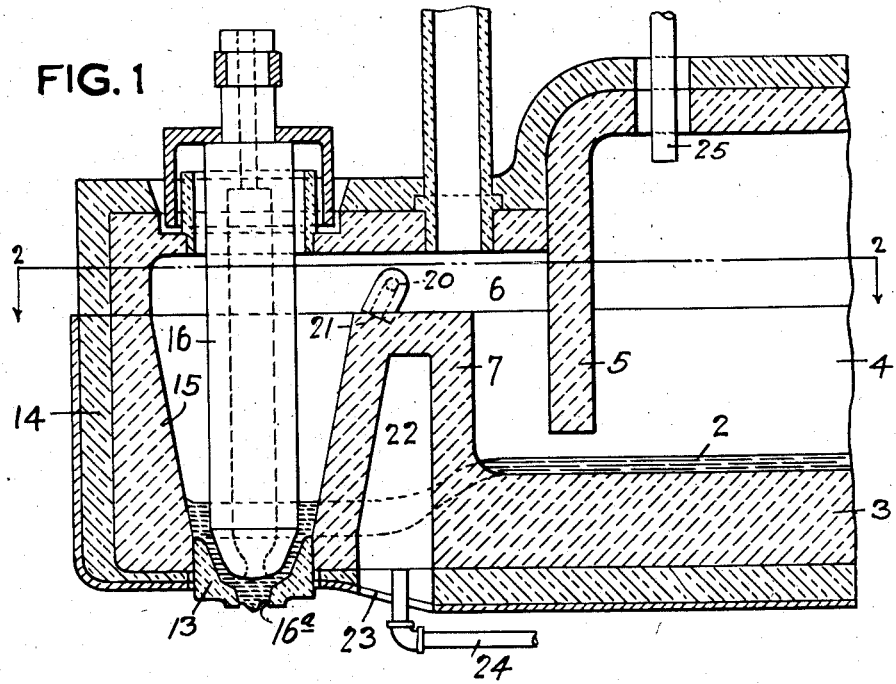

Sept. 15, 1925.

G. E. HOWARD

FEEDING MOLTEN GLASS

Filed April 4, 1923

1,553,819

2 Sheets-Sheet 1

INVENTOR
George E Howard
By Kay, Totten & Brown,
Attorneys

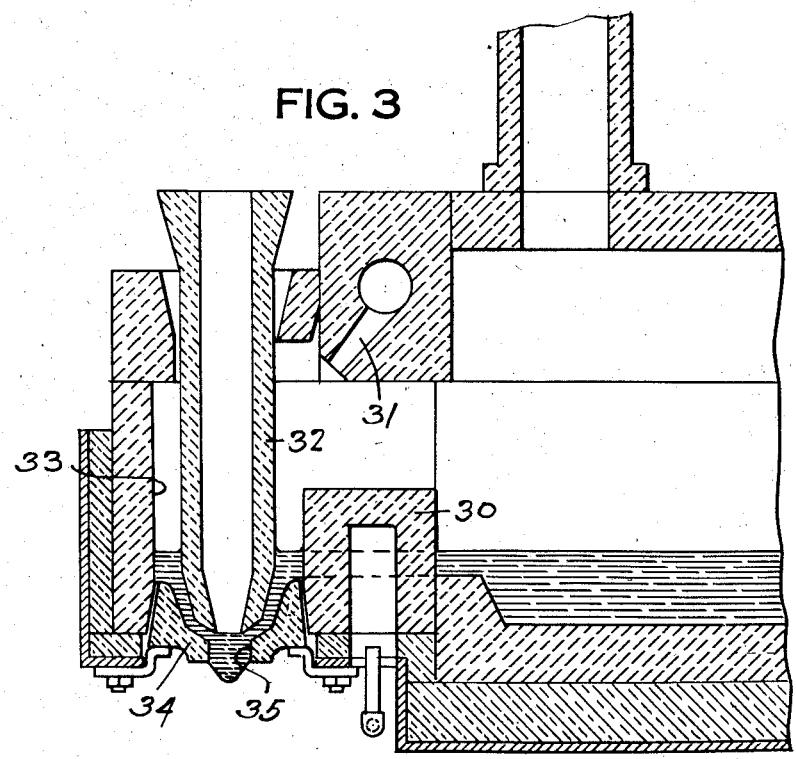

Patented Sept. 15, 1925.

1,553,819

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

FEEDING MOLTEN GLASS.

Application filed April 4, 1923. Serial No. 629,817.

*To all whom it may concern:*

Be it known that I, GEORGE E. HOWARD, a citizen of the United States, and resident of Butler, in the county of Butler and State of Pennsylvania, have invented a new and useful Improvement in Feeding Molten Glass; and I do hereby declare the following to be a full, clear, and exact description thereof.

My invention relates to the production of mold charges of molten glass, and it has special reference to the system known as gob feeding or suspended-charge feeding, wherein molten glass is caused to issue from a discharge outlet and is formed into a succession of freely-hanging gobs or mold-charges, which are individually severed and then dropped into molds.

One of the objects of my invention is to control the temperature of the mold charges so as to cause each mold charge to be uniform in temperature, or at least symmetrical in temperature, at the time when it is delivered into the mold.

Another object of my invention is to provide improved apparatus for carrying out the method of glass feeding herein disclosed.

In my application for Letters Patent filed February 27, 1919, Serial No. 279,541, of which the present application is a continuation, I have disclosed a glass feeding system including a tank furnace or other source of molten glass, an extension or forehearth arranged to receive molten glass from the tank furnace, a gate for controlling the flow of glass from the tank furnace to the forehearth, a discharge opening in the bottom of the forehearth, and a plunger which reciprocates vertically above the discharge opening and shapes the issuing glass into a succession of mold charges.

The present application is concerned with the portion of this system which delivers the molten glass to the discharge opening in a plurality of streams approaching the discharge opening from different directions, for the purpose of equalizing variations in the temperature of the glass. The specific means employed in the system of my prior application for thus delivering the glass to the discharge outlet in a plurality of streams consists of a baffle, island, or dividing block interposed in the path of the stream of glass which flows through the forehearth, this baffle operating to divide the glass into two similar streams which unite again at the outlet. This construction is also shown in the drawing accompanying the present application, and is employed as the basis of the description which follows. It will be understood, however, that other specific means may be employed, within the scope of my invention, for bringing the glass to the discharge outlet in a plurality of streams.

Figure 2:
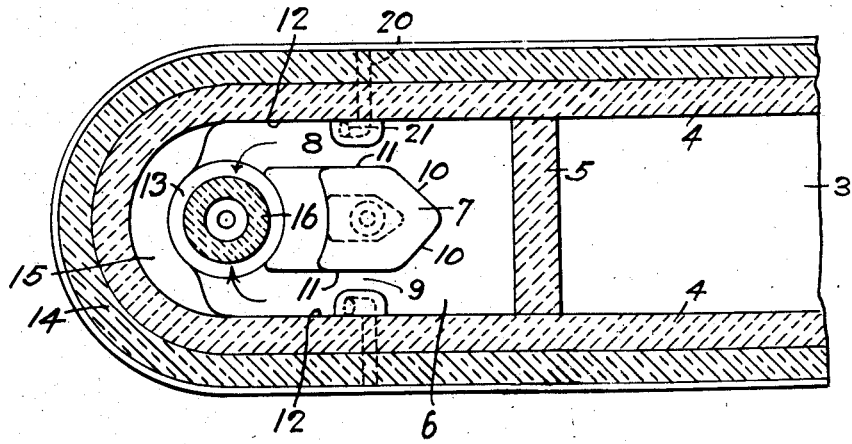

In the accompanying drawing, Fig. 1 is a longitudinal vertical sectional view taken centrally through a glass feeder embodying my invention; Fig. 2 is a horizontal view of the same apparatus, with parts in section on the line 2—2, Fig. 1; and Fig. 3 is a longitudinal vertical sectional view showing a modified construction.

When molten glass is caused to flow in a container such as the forehearth of a tank furnace, and is then delivered through a discharge opening, the issuing glass has a tendency to stratification or non-uniformity in temperature, which is due to the fact that some of the glass flows into the discharge outlet directly from the middle of the hot body of glass flowing from the furnace or other source of glass supply, while other parts of the glass flow into the discharge outlet partly from the more outlying mass of glass which has already accumulated in the front end of the feeding receptacle, or which is flowing nearer the side walls of the receptacle and into the lateral and back sides of the outlet or well, all of which outlying glass has had time to cool more or less by radiation of heat through the walls of the receptacle. This is especially so when a plunger or other implement is used in the well or outlet. The plunger, by intercepting the hot gases and the heat radiated from the furnace or forehearth, causes what may aptly be called "a cold shadow" on its front side farthest away from the furnace.

In such cases, the glass flowing around and behind the plunger and into its "cold shadow" side become progressively more chilled than the glass flowing more directly into the well on the furnace side of the plunger. When the issuing glass is formed into suspended mold-charges or gobs, the side of each mold charge nearest the furnace tends to be hotter than the opposite side. This unevenness of temperature causes unequal distribution in the finished glassware and makes it necessary that the bottle or other article be made heavier than would otherwise be required, in order that its thinnest portion shall be sufficiently strong. Also, uneven wavy streaks are produced in the ware, which greatly injure its appearance.

My present invention avoids these difficulties by bringing the fresh hot glass from the furnace to the discharge outlet in two or more steams of substantially equal temperature, which approach the outlet from different directions and are combined at the outlet. If two such streams are employed, the mold charges formed by the combination of such streams will be of equal temperature on opposite sides and will thus be symmetrical in temperature, even though their temperature may not be perfectly uniform. When a plunger is used, these different streams also tend to keep the plunger equally heated on its opposite sides, thereby extending the heating effect substantially around the plunger, and thus eliminating, or at least minimizing, the cold shadow effect.

The accompanying drawing shows the front portion of a glass feeder constructed substantially as shown in my prior application for Letters Patent, Serial No. 279,541. The back gate or cutoff valve shown in my prior application has been omitted, since it forms no part of my present invention and may or may not be employed in connection with this invention. A stream of glass, indicated at 2, Fig. 1, flows in a channel formed by refractory bottom members 3 and side walls 4, passes under a partition 5 which may be provided for separating the discharge end of the feeder from the hot furnace chamber, and then enters a discharge chamber 6.

A baffle 7 of refractory material is interposed in the glass channel within the chamber 6 and deflects the glass into two channels 8 and 9, which extend forward separately along the diverging walls 10 of the baffle 7, and then continue in parallel paths formed between the side walls 11 of the baffle 7 and the adjacent walls 12 of the chamber 6. Finally, the two streams of glass enter a cup or well 13 from opposite sides, as shown by the arrows on Fig. 2. Beyond the cup 13, and adjacent to the front wall 14 of the forehearth, is a refractory baffle 15 which slopes downward to a point adjacent to the cup 13 so as to confine the glass to the space immediately above the cup 13. This prevents the accumulation of glass in the front end of the forehearth beyond the discharge outlet which would tend to chill and devitrify the glass and would produce streaks in the delivered glass.

A plunger 16, which may be constructed and operated in the manner shown in my prior application, Serial No. 279,541, is arranged to reciprocate vertically above the discharge outlet 16 of the cup 13 for the purpose of forming the issuing glass into suspended mold-charges. The mechanism for reciprocating this plunger forms no part of my present invention, and has therefore been omitted from the accompanying drawing.

Air for cooling the glass as it approaches the discharge outlet may be delivered into the chamber 6 by means of pipes 20 projecting into opposite sides of the chamber 6 through openings 21. The baffle block 7 may be provided with a cooling chamber 22, which may be open to the air at 23. Air from a pipe 24 may be blown into the chamber 22 for cooling the baffle block. If desired, the pipes 20 and 24, or either of them, may be made to discharge heating flames instead of cooling air. A fuel outlet pipe is shown at 25 for projecting flame upon the flowing glass. It will thus be seen that a variety of means are provided for changing the temperature of the flowing glass, and that the temperature of the glass may thus be controlled within wide limits.

The baffle or dividing block 7 may be built into the feeder as an integral part of the refractory bottom 3 or, if preferred, the baffle may be made separate from the other parts of the feeder and may be set removably in the glass channel. The latter construction permits the baffle to be readily replaced in case it should be worn away faster than the other portions of the feeder which are subject to erosion by the flowing glass.

Fig. 3 shows a construction which is generally similar to that of Figs. 1 and 2. In Fig. 3, however, the top of the dividing block or island 30 is considerably lower than that of the dividing block 7 of Figs. 1 and 2. Also, Fig. 8 shows a fuel inlet 31 above the dividing block 30 for directing flame forwardly around the vertical plunger 32 and against the front wall 33 which is immediately beyond the well or cup 34. A discharge outlet 35 is formed in the well 34 in line with the axis of the plunger 22. In this construction no baffle is required beyond the well 34, the wall 33 being itself so formed as to prevent accumulation of glass in front of the well.

The construction of Fig. 3, wherein the dividing block is relatively low, provides more combustion space above the dividing block than the construction of Fig. 1, and thus makes it possible to apply more heat to the surface of the flowing glass. Also, it will be noted that the flames from the fuel inlet 31 are directed against the front wall 33 and are deflected upon, or their heat is reflected into contact with, the flowing glass. This heats the upper portion of the flowing glass and tends to equalize its temperature, especially when the glass is at a high level. This heating action is particularly effective upon the glass at the front of the feeder and is relied upon to equalize the temperature of the glass which may rise above the level of the dividing block 30 when the feeder is flooded or when, for any reason, it is desired to keep a high head of glass above the discharge outlet 35. The lower strata of the glass are equalized in temperature by the dividing block, as described in connection with Figs. 1 and 2.

At lower glass levels the flames have less equalizing effect than when the glass is above the dividing block, but under these circumstances a smaller body of glass is present and the action of the dividing block is sufficient to equalize the temperature of the glass by bringing the glass to opposite sides of the discharge outlet in the manner described above.

It will be noted that the channels through which the glass flows are so proportioned that the cross section of the glass decreases progressively from the original stream entering the feeder to the glass outlet. This insures that the glass is kept moving at all points within the feeder at a velocity which is never substantially checked or decreased, with the result that the glass is prevented from accumulating or clogging.

It will also be noted that the lower end of the plunger nearly fills the well above the discharge outlet, so that there is never any large body of glass above the outlet. Therefore the symmetrical condition of the glass, produced by bringing the glass into the well in separate streams, is carried into the issuing glass and into the gobs which are formed below the outlet. This result would not be obtained if the separated streams of glass were led into a large reservoir before reaching the discharge outlet, or if the streams were re-combined before being brought to the discharge well, since in both of such cases the streams of glass would be so mingled together before being discharged that their temperature symmetry would be destroyed.

It is to be understood that the dividing block or baffle herein shown may be given any desired shape, and while the configuration shown in the drawing has been found effective in actual practice, I do not wish to be restricted to the details of form or location herein specifically shown. Neither do I wish to be restricted to the use of the specific plunger mechanism shown in the accompanying drawing nor to the precise details of construction herein selected for illustrating the forehearth and its attachments. It will be understood that my invention includes broadly the delivery of molten glass to a discharge outlet in a plurality of streams, without regard to the precise number or arrangement of such streams, or to the mechanism by which such streams of glass are produced. It will also be understood that the system herein shown may be otherwise modified within the scope of the appended claims.

I claim as my invention:

1. The method of feeding molten glass that comprises establishing a flowing stream of glass, dividing said stream, and delivering the divisions of said stream downwardly through a feed outlet.

2. The method of feeding molten glass that comprises establishing a flowing stream of glass, dividing said stream into two substantially equal divisions, and delivering said divisions to a downwardly opening feed outlet from opposite sides of said outlet.

3. The method of producing mold-charges of molten glass having symmetrical temperature, that comprises delivering molten glass to a downwardly opening feed outlet in a plurality of streams having substantially similar temperature characteristics and approaching said outlet from different directions, and discharging the combined streams from the said outlet in a succession of mold charges.

4. The method of producing mold-charges of molten glass having symmetrical temperature, that comprises delivering molten glass to opposite sides of a downwardly opening discharge outlet in two streams having substantially similar temperature characteristics, and discharging the combined streams through the said outlet in a succession of mold charges.

5. Glass-feeding apparatus comprising a receptacle having a downwardly opening feed outlet, and means for delivering molten glass to the said outlet in a plurality of streams approaching said outlet from different direction.

6. Glass-feeding apparatus comprising a receptacle having a downwardly opening feed outlet, and means for delivering molten glass to the said outlet in two streams approaching said outlet from opposite sides thereof.

7. The method of producing mold charges of molten glass that comprises causing a stream of glass to flow toward a downwardly opening feed outlet, dividing said stream into two smaller streams, each of which is larger than the area of said outlet, and bringing said streams to said outlet from opposite sides thereof.

8. Glass-feeding apparatus comprising a receptacle having a discharge outlet, means for causing a stream of molten glass to flow toward said outlet, a dividing member or island interposed in the path of said stream, and means for projecting flame upon the surface of the glass in the vicinity of said dividing member.

9. Glass-feeding apparatus comprising a receptacle having a discharge outlet, and having a front wall beyond said outlet, means for causing a stream of molten glass to flow toward said outlet, a dividing member or island interposed in the path of said stream, and means above said dividing member for projecting flame forwardly and downwardly against said front wall.

10. Glass-feeding apparatus comprising a receptacle having an outlet, means for discharging molten glass from said outlet to form a succession of freely-hanging mold charges, and means for supplying a plurality of streams of molten glass to said outlet.

11. Glass-feeding apparatus comprising a receptacle having an outlet, means for discharging molten glass from said outlet in a succession of freely-hanging mold charges, and means for supplying molten glass to said outlet from opposite sides thereof.

12. Glass-feeding apparatus comprising a receptacle having a discharge outlet, a channel for conducting glass to said outlet, and means disposed in said channel for dividing the flowing glass into a plurality of streams and for causing said streams to approach the said outlet from different directions.

13. Glass-feeding apparatus comprising a receptacle having a discharge outlet, a channel for conducting glass to said outlet, and a dividing member disposed in said channel for dividing the flowing glass into two streams and for directing said streams to opposite sides of the said discharge outlet.

14. Glass-feeding apparatus comprising a receptacle having a downwardly opening discharge outlet, a vertical plunger mounted for vertical reciprocation above said outlet, means for causing a stream of molten glass to flow toward said discharge outlet and a dividing member for dividing said stream of glass into two sections approaching said discharge outlet and plunger from opposite sides thereof.

15. Glass-feeding apparatus comprising a forehearth, a cup or well having an opening which forms a discharge outlet from said forehearth, a vertical plunger mounted for vertical reciprocation above said opening, and a dividing member disposed adjacent to said cup for dividing the glass flowing in the said forehearth into two streams and for causing said glass to enter said cup from opposite sides of said plunger.

16. Glass-feeding apparatus comprising a forehearth, a cup or well having an opening which forms a discharge outlet from said forehearth, a vertical plunger mounted for vertical reciprocation above said opening, a dividing member disposed adjacent to said cup for dividing the glass flowing in the said forehearth into two streams and for causing said glass to enter cup from opposite sides of said plunger, and a baffle member adjacent to said cup on the side of said cup opposite to said dividing member, said baffle member serving to prevent glass from accumulating beyond said cup.

17. Apparatus for feeding molten glass comprising a tank forehearth having an enclosed outer end, a well formed in the bottom of said forehearth and at the outer end thereof, with no substantial space between said closed outer end and said well, a downwardly opening discharge outlet formed in the bottom of said well, a dividing block or island disposed in said forehearth for dividing the glass flowing toward said well, and a vertically reciprocable plunger member disposed above said outlet and adapted to enter said well.

18. Apparatus for feeding molten glass comprising a receptacle having a discharge outlet, a channel for conducting a stream of glass toward said outlet and an island member disposed in said channel for dividing said stream on its way to said outlet.

19. In glass feeding apparatus the combination of a glass conducting channel comprising a vertical front wall, said channel being formed with a discharge well or passageway extending downward, a reciprocating plunger projecting downward into said channel to control the flow of glass therefrom, and a baffle projecting upward from the floor of the channel, said baffle being immediately behind the plunger and extending laterally beyond the side surfaces of the plunger in position to deflect the flowing glass to opposite sides of the plunger.

20. The combination of a glass conducting channel provided with a downwardly opening discharge passage and a plunger projecting downward into said passage, and a baffle or raised portion directly behind the plunger, the width of the baffle being equal to or greater than the diameter of the discharge opening.

21. The combination of a glass conducting channel provided with a downwardly opening discharge passage, and a plunger projecting downward into said passage, channel being provided with a baffle or raised portion directly behind the plunger, said baffle formed with rearwardly converging side walls, and the front wall of the baffle extending laterally beyond the sides of the plunger.

22. The combination of a glass conducting channel provided with a downwardly opening discharge passage, and a plunger projecting downward into said passage, said channel being provided with a baffle or raised portion directly behind the plunger, said baffle being inclined downwardly and forwardly, and extending laterally beyond the sides of the plunger to deflect and direct the flow of glass to opposite sides of the said plunger.

In testimony whereof I the said GEORGE E. HOWARD have hereunto set my hand.

GEORGE E. HOWARD.